(12) United States Patent
Izumi

(10) Patent No.: US 11,318,565 B2
(45) Date of Patent: May 3, 2022

(54) MACHINING CONDITION ADJUSTMENT DEVICE AND MACHINE LEARNING DEVICE

(71) Applicant: FANUC Corporation, Yamanashi (JP)

(72) Inventor: Takashi Izumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 145 days.

(21) Appl. No.: 16/541,157

(22) Filed: Aug. 15, 2019

(65) Prior Publication Data

US 2020/0061755 A1  Feb. 27, 2020

(30) Foreign Application Priority Data

Aug. 24, 2018 (JP) .............................. JP2018-157523

(51) Int. Cl.
| | | |
|---|---|---|
| B23K 31/00 | (2006.01) | |
| B23K 26/14 | (2014.01) | |
| B23K 26/70 | (2014.01) | |
| G06N 3/08 | (2006.01) | |

(52) U.S. Cl.
CPC ........ B23K 31/006 (2013.01); B23K 26/1462 (2015.10); B23K 26/705 (2015.10); G06N 3/08 (2013.01)

(58) Field of Classification Search
CPC .............. B23K 31/006; B23K 26/1462; B23K 26/0884; G06N 3/08
USPC .............. 219/121.62, 121.7, 121.71, 121.83, 219/121.84; 359/350; 315/111.31; 361/203
See application file for complete search history.

(56) References Cited

U.S. PATENT DOCUMENTS

| | | | | | |
|---|---|---|---|---|---|
| 3,913,520 | A | * | 10/1975 | Berg ........................ | B05D 7/02 118/679 |
| 4,630,167 | A | * | 12/1986 | Huggins ................... | H05F 3/04 361/213 |
| 4,809,127 | A | * | 2/1989 | Steinman ................. | H01T 23/00 361/213 |
| 5,089,685 | A | | 2/1992 | Schmidt-Hebbel | |
| 5,247,155 | A | | 9/1993 | Steen et al. | |
| RE34,806 | E | * | 12/1994 | Cann ..................... | C23C 16/513 118/723 DC |
| 5,700,989 | A | * | 12/1997 | Dykhno ................. | B23K 28/02 219/121.45 |
| 5,705,785 | A | * | 1/1998 | Dykhno ................. | B23K 28/02 219/121.45 |

(Continued)

FOREIGN PATENT DOCUMENTS

| | | |
|---|---|---|
| CN | 1953837 A | 4/2007 |
| CN | 105073333 A | 11/2015 |

(Continued)

*Primary Examiner* — Jimmy Chou
(74) *Attorney, Agent, or Firm* — Hauptman Ham, LLP

(57) ABSTRACT

A machining condition adjustment device adjusts settings of an ionizer so as to neutralize a charge carried by plasma generated during laser beam machining of a workpiece by a laser beam machining device, calculates an amount of charge per unit time that is to be radiated from the ionizer, based on the amount of charge carried by the plasma generated during the laser beam machining, and sets the ionizer to radiate the calculated amount of charge per unit time.

6 Claims, 6 Drawing Sheets

(56) References Cited

U.S. PATENT DOCUMENTS

| | | | | |
|---|---|---|---|---|
| 5,821,493 A * | 10/1998 | Beyer | B23K 26/348 | 219/121.46 |
| 5,895,632 A * | 4/1999 | Nomura | H05F 3/04 | 422/186.04 |
| 6,388,227 B1 * | 5/2002 | Dykhno | B23K 26/1429 | 219/121.45 |
| 6,414,438 B1 * | 7/2002 | Borisov | H05G 2/003 | 219/121.48 |
| 6,541,786 B1 * | 4/2003 | Partlo | H05G 2/003 | 250/504 R |
| 6,771,684 B2 * | 8/2004 | Hill | H01S 1/005 | 372/55 |
| 7,031,133 B2 * | 4/2006 | Riebel | H01T 23/00 | 361/212 |
| 7,572,998 B2 * | 8/2009 | Mohamed | H05H 1/2406 | 219/121.48 |
| 7,728,253 B2 * | 6/2010 | Hopwood | G01N 15/0656 | 219/121.46 |
| 7,905,199 B2 * | 3/2011 | Hautala | C23C 26/00 | 118/723 CB |
| 8,173,959 B1 * | 5/2012 | Boumsellek | H01J 49/004 | 250/288 |
| 8,471,171 B2 * | 6/2013 | Price | H05H 1/46 | 219/121.5 |
| 8,502,108 B2 * | 8/2013 | Mohamed | H05H 1/48 | 219/121.5 |
| 8,885,316 B2 * | 11/2014 | Sato | H01T 23/00 | 361/230 |
| 9,887,078 B2 * | 2/2018 | Kim | H01L 21/67028 | |
| 10,518,357 B2 * | 12/2019 | Furuya | B23K 26/0884 | |
| 2003/0043529 A1 * | 3/2003 | Jacobs | B03C 3/68 | 361/220 |
| 2003/0102294 A1 * | 6/2003 | Kinbara | B23K 26/04 | 219/121.83 |
| 2004/0262269 A1 * | 12/2004 | Matile | B23K 28/02 | 219/121.46 |
| 2005/0011868 A1 * | 1/2005 | Matile | B23K 28/02 | 219/121.64 |
| 2005/0069011 A1 * | 3/2005 | Hill | H01S 3/2232 | 372/76 |
| 2005/0107918 A1 * | 5/2005 | Watanabe | B25J 9/1684 | 700/245 |
| 2005/0161595 A1 * | 7/2005 | Cotter | H01J 49/40 | 250/290 |
| 2005/0178749 A1 * | 8/2005 | Yamazaki | B23K 26/38 | 219/121.62 |
| 2005/0178975 A1 * | 8/2005 | Glukhoy | H01J 49/147 | 250/427 |
| 2005/0189484 A1 * | 9/2005 | Glukhoy | H01J 49/061 | 250/287 |
| 2005/0230614 A1 * | 10/2005 | Glukhoy | H01J 49/0022 | 250/287 |
| 2005/0236375 A1 | 10/2005 | Gefter et al. | | |
| 2006/0262825 A1 * | 11/2006 | Rocca | H01S 3/0323 | 372/55 |
| 2007/0045252 A1 * | 3/2007 | Kleine | B23K 26/38 | 219/121.69 |
| 2007/0058244 A1 * | 3/2007 | Singer | G03F 7/70116 | 359/350 |
| 2007/0075051 A1 * | 4/2007 | Morrisroe | G01J 1/42 | 219/121.52 |
| 2007/0084999 A1 * | 4/2007 | Miller | H01J 49/0018 | 250/288 |
| 2007/0119827 A1 * | 5/2007 | Miller | B64C 23/005 | 219/121.51 |
| 2007/0133145 A1 * | 6/2007 | Sato | H01T 19/04 | 361/220 |
| 2007/0279829 A1 * | 12/2007 | Getter | H01T 23/00 | 361/213 |
| 2007/0285871 A1 * | 12/2007 | Lee | H01T 19/00 | 361/235 |
| 2008/0130190 A1 * | 6/2008 | Shimada | H01T 23/00 | 361/231 |
| 2008/0267816 A1 * | 10/2008 | Ueno | B08B 17/02 | 422/24 |
| 2010/0276590 A1 * | 11/2010 | Syms | H01J 49/067 | 250/288 |
| 2011/0222040 A1 * | 9/2011 | Steinhoff | H05G 2/003 | 355/67 |
| 2011/0272386 A1 * | 11/2011 | Morrisroe | B23K 10/00 | 219/121.52 |
| 2012/0160997 A1 * | 6/2012 | Fink | H01J 49/10 | 250/282 |
| 2012/0234802 A1 * | 9/2012 | Wahl | B23K 26/38 | 219/121.44 |
| 2014/0021173 A1 * | 1/2014 | Morrisroe | H05H 1/30 | 219/121.5 |
| 2014/0224775 A1 * | 8/2014 | Sharp | H05H 1/26 | 219/121.5 |
| 2015/0021301 A1 * | 1/2015 | Freysz | B23K 10/00 | 219/121.45 |
| 2015/0034612 A1 * | 2/2015 | Hosseini | B23K 26/356 | 219/121.61 |
| 2015/0038313 A1 * | 2/2015 | Hosseini | B23K 26/38 | 501/32 |
| 2015/0048061 A1 * | 2/2015 | Morrisroe | H01F 38/14 | 219/121.52 |
| 2015/0053656 A1 * | 2/2015 | Popp | B23K 10/00 | 219/121.44 |
| 2015/0276473 A1 * | 10/2015 | Izumi | H01S 3/139 | 356/121 |
| 2016/0074963 A1 * | 3/2016 | Zollinger | B23K 26/0823 | 219/121.62 |
| 2016/0074964 A1 * | 3/2016 | Zollinger | B23K 26/0604 | 219/121.64 |
| 2016/0114425 A1 * | 4/2016 | Liu | B23K 26/342 | 65/17.3 |
| 2016/0163527 A1 * | 6/2016 | Sekimoto | H01J 49/26 | 250/288 |
| 2016/0255711 A1 * | 9/2016 | Morrisroe | B23K 10/02 | 219/121.48 |
| 2017/0151618 A1 | 6/2017 | Shirai | | |
| 2018/0147665 A1 * | 5/2018 | Furuya | B23K 26/0884 | |
| 2018/0164756 A1 | 6/2018 | Yamaguchi | | |
| 2020/0028331 A1 * | 1/2020 | Sandanayaka | H01S 5/026 | |
| 2020/0061753 A1 * | 2/2020 | Izumi | B23K 26/702 | |

FOREIGN PATENT DOCUMENTS

| | | |
|---|---|---|
| CN | 106814698 A | 6/2017 |
| CN | 108227482 A | 6/2018 |
| JP | S51147097 A | 12/1976 |
| JP | H3199907 A | 8/1991 |
| JP | 200184577 A | 3/2001 |
| JP | 2004122174 A | 4/2004 |
| JP | 2005219093 A | 8/2005 |
| JP | 2009-154189 A | 7/2009 |
| WO | 2014158346 A1 | 10/2014 |

* cited by examiner

| | MATERIAL TYPE | PLATE THICKNESS | CORRECTION FACTOR a | CORRECTION FACTOR b | ... |
|---|---|---|---|---|---|
| 1 | $Wm_1$ | $Wt_1$ | $K_{a1}$ | $K_{b1}$ | ... |
| 2 | $Wm_2$ | $Wt_2$ | $K_{a2}$ | $K_{b2}$ | ... |
| 3 | $Wm_3$ | $Wt_3$ | $K_{a3}$ | $K_{b3}$ | ... |
| ⋮ | ... | ... | ... | ... | ... |

MACHINING CONDITION ADJUSTMENT DEVICE AND MACHINE LEARNING DEVICE

RELATED APPLICATIONS

The present application claims priority to Japanese Patent Application Number 2018-157523 filed Aug. 24, 2018, the disclosure of which is hereby incorporated by reference herein in its entirety.

BACKGROUND OF THE INVENTION

1. Field of the Invention

The present invention relates to a machining condition adjustment device and a machine learning device.

2. Description of the Related Art

In laser beam cutting machining, material machining is carried out so that molten metal is blown away by laser and flow of assist gas while a constant interval is kept between a workpiece and a nozzle and while a focal position is kept constant. Conventionally, importance has been attached to a pressure exerted on the workpiece during the cutting and it has been thought that a distance between the workpiece and the nozzle should be as short as possible, as typified by Japanese Patent Application Laid-Open No. 2009-154189, for instance.

When high-speed cutting is carried out with the nozzle and the workpiece made close to each other, a rough machined surface is caused by generation of plasma. In addition, expansion of kerf caused by the generation of the plasma frequently results in adhesion of dross (objects like burrs) to the workpiece, so that it may be made difficult to set conditions.

SUMMARY OF THE INVENTION

In view of the above, an object of the present invention is to provide a machining condition adjustment device and a machine learning device that adjust settings of an ionizer so as to neutralize a charge carried by the plasma generated during laser beam machining of the workpiece.

The machining condition adjustment device of the invention reduces the generation of the plasma by using a portion with high flow speed (Mach disk portion) of assist gas ejected from a nozzle and neutralizes the plasma by detecting an amount of the generated plasma and radiating an opposite electric charge to the detected amount (amount of charge) of the generated plasma, in order that cutting quality may be improved.

FIG. 7 is a diagram illustrating flow of assist gas ejected from an end of a nozzle in laser beam machining by a laser beam machining device.

In FIG. 7, (1) denotes a position of an end part of a nozzle 6 where a gas pressure of assist gas 7 is maximized. It has been thought that a high pressure is preferably exerted on the workpiece in the laser beam machining, as described above, and thus the machining is carried out at position (2) slightly distant from the end part of the nozzle 6 (because the machining at position (1) causes intimate contact between the end of the nozzle 6 and the workpiece and may cause damage to the nozzle 6 from heat, or the like). On condition that the assist gas 7 is ejected at an ultra-high speed from the end of the nozzle 6, however, a shock wave is generated from a mouth of the nozzle 6 so as to form a wall, which re-converges the assist gas 7 so as to maximize a flow speed of the assist gas 7 at position (3). As a result of iteration of experiments with attention to such a point where the flow speed of the assist gas 7 is maximized, it has been found out that the machining of the workpiece with reduction in the amount of the generated plasma to a certain degree and with satisfactory cutting quality may be attained by the laser beam machining subsequent to positioning of a surface of the workpiece at flow-speed maximizing position (3) for the assist gas 7 or a position that is slightly closer to the nozzle 6 than position (3). Influence of the plasma generated then on the laser beam machining is reduced by measurement of the amount (amount of charge) of the generated plasma and radiation of the opposite charge to the measured amount of charge with use of an ionizer or the like, in order that the cutting quality may be improved.

One aspect of a machining condition adjustment device according to the present invention is a machining condition adjustment device that adjusts settings of an ionizer so as to neutralize a charge carried by plasma generated during laser beam machining of a workpiece by a laser beam machining device. The machining condition adjustment device includes an ion content calculation unit and a control unit. The ion content calculation unit calculates an amount of charge per unit time that is to be radiated from the ionizer, based on at least an amount of charge carried by the plasma generated during the laser beam machining. The control unit sets the ionizer to radiate the amount of charge per unit time calculated by the ion content calculation unit.

The machining condition adjustment device may further include a correction factor storage unit in which a correction factor set in association with at least material and a plate thickness of the workpiece is stored. The ion content calculation unit may calculate a correction value for correction for the amount of charge per unit time that is calculated based on the amount of charge carried by the plasma generated during the laser beam machining and that is to be radiated from the ionizer, with use of a preset correction equation, based on the correction factor read out from the correction factor storage unit based on the material and the plate thickness of the workpiece to be subjected to the laser beam machining and a laser beam machining condition set for the laser beam machining.

The machining condition adjustment device may further include: a preprocessing unit that produces state variables including ionizer setting data related to the settings of the ionizer, workpiece data related to the workpiece, plasma generation state data related to the amount of charge carried by the plasma generated during the laser beam machining, and machining condition data indicating a machining condition during the laser beam machining; and a state determination unit that produces determination data including plasma generation amount determination data for determination of appropriateness of the amount of charge carried by the plasma in the laser beam machining by the laser beam machining device. The ion content calculation unit may include a learning unit that learns adjustment action for the settings of the ionizer with respect to the amount of charge carried by the plasma generated in the laser beam machining of the workpiece under a prescribed laser beam machining condition, with use of the state variables and the determination data. The plasma generation amount determination data may be intended for the determination of appropriateness of the amount of charge carried by the plasma generated in the laser beam machining of the workpiece under the laser beam machining condition adjusted by the adjustment action for the settings of the ionizer.

The learning unit may conduct reinforcement learning in which a high reward is conferred when the amount of charge carried by the plasma generated in the laser beam machining of the workpiece under the prescribed laser beam machining condition is near to a neutralized state.

The machining condition adjustment device may further include: the preprocessing unit that produces the state variables including the ionizer setting data related to the settings of the ionizer, the workpiece data related to the workpiece, the plasma generation state data related to the amount of charge carried by the plasma generated during the laser beam machining, and the machining condition data indicating the machining condition during the laser beam machining; a learning model storage unit that stores a learned model that has learned the adjustment action for the settings of the ionizer with respect to the amount of charge carried by the plasma generated in the laser beam machining of the workpiece under the prescribed laser beam machining condition; and a decision making unit that estimates the adjustment action for the settings of the ionizer with use of the learned model based on the state variables.

The adjustment action for the settings of the ionizer may be adjustment action for an amount of charge per unit time that is to be radiated to a vicinity of a machined portion during the laser beam machining.

One form of a machine learning device according to the present invention is a machine learning device that adjusts settings of an ionizer so as to neutralize a charge carried by plasma generated during laser beam machining of a workpiece by a laser beam machining device. The machine learning device includes a learning unit that learns adjustment action for the settings of the ionizer with respect to an amount of charge carried by the plasma generated in the laser beam machining of the workpiece under a prescribed laser beam machining condition, with use of state variables including ionizer setting data related to the settings of the ionizer, workpiece data related to the workpiece, plasma generation state data related to the amount of charge carried by the plasma generated during the laser beam machining, and machining condition data indicating a machining condition during the laser beam machining and determination data including plasma generation amount determination data for determination of appropriateness of the amount of charge carried by the plasma in the laser beam machining by the laser beam machining device. The plasma generation amount determination data is intended for the determination of appropriateness of the amount of charge carried by the plasma generated in the laser beam machining of the workpiece under the laser beam machining condition adjusted by the adjustment action for the settings of the ionizer.

Another form of a machine learning device according to the present invention is a machine learning device that adjusts settings of an ionizer so as to neutralize a charge carried by plasma generated during laser beam machining of a workpiece by a laser beam machining device. The machine learning device includes a learning model storage unit and a decision making unit. The learning model storage unit stores a learned model that has learned adjustment action for the settings of the ionizer with respect to the amount of charge carried by the plasma generated in the laser beam machining of the workpiece under a prescribed laser beam machining condition. A decision making unit estimates the adjustment action for the settings of the ionizer with use of the learned model based on state variables including ionizer setting data related to the settings of the ionizer, workpiece data related to the workpiece, plasma generation state data related to the amount of charge carried by the plasma generated during the laser beam machining, and machining condition data indicating a machining condition during the laser beam machining.

According to the present invention, improvement in the cutting quality for the workpiece is enabled by neutralization of the charge carried by the plasma generated during the laser beam machining of the workpiece by the laser beam machining device.

DETAILED DESCRIPTION OF THE PREFERRED EMBODIMENTS

Figure 1:
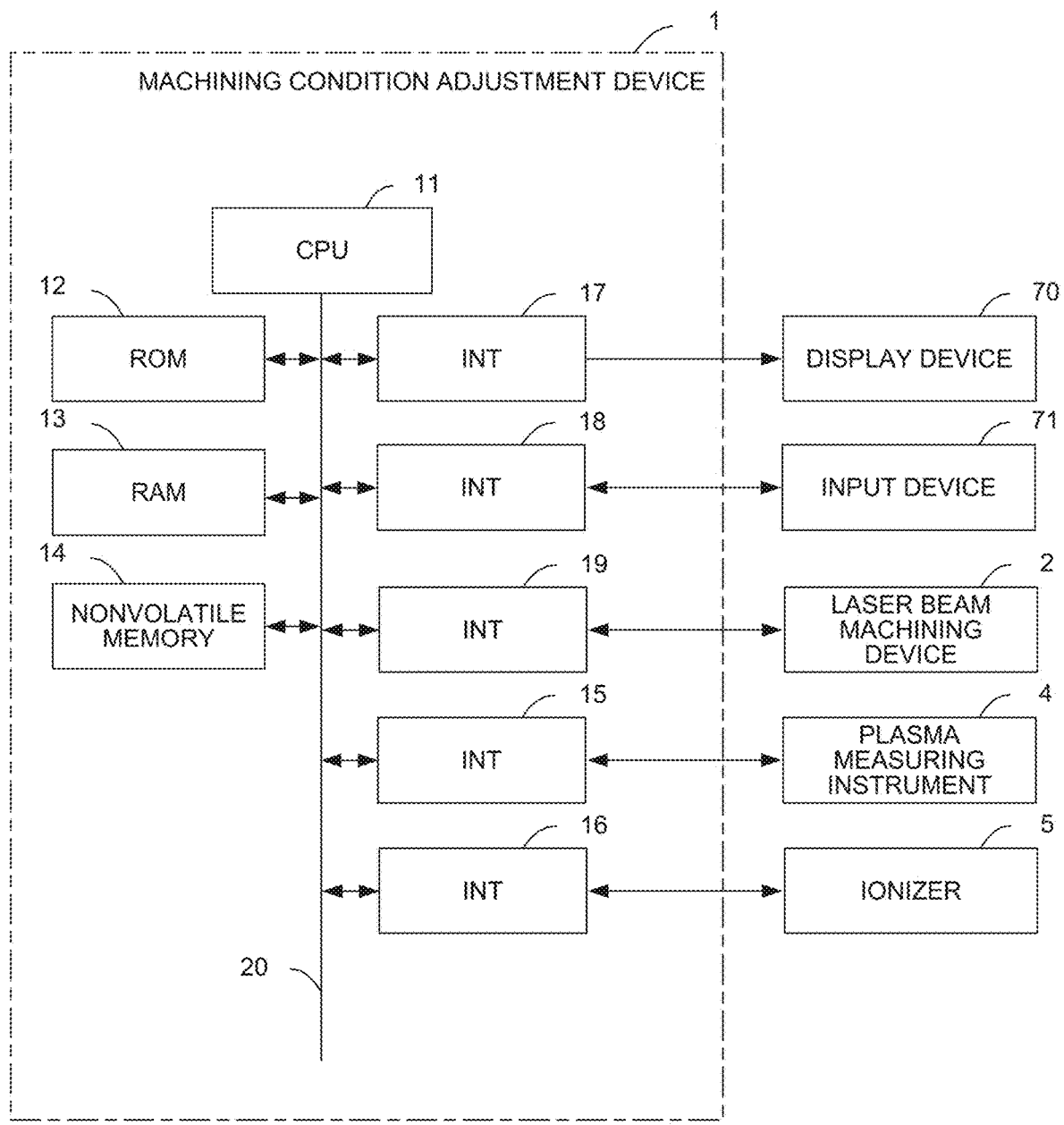
FIG. 1 is a schematic hardware configuration diagram illustrating a machining condition adjustment device according to a first embodiment.

FIG. 1 is a schematic hardware configuration diagram illustrating major parts of a machining condition adjustment device according to a first embodiment.

A machining condition adjustment device 1 may be implemented as a controller that controls a laser beam machining device, a personal computer incorporated with a controller that controls a laser beam machining device, or a computer, such as a cell computer, a host computer, an edge server, or a cloud server, connected through a wired/wireless network to the controller, for instance. As the embodiment, an example is presented in which the machining condition adjustment device 1 is implemented as a controller that controls a laser beam machining device 2.

A CPU 11 included by the machining condition adjustment device 1 is a processor that generally controls the machining condition adjustment device 1, reads out system programs stored in a ROM 12 through a bus 20, and controls the whole machining condition adjustment device 1 in accordance with the system programs. Temporary calculation data, various types of data inputted by an operator through an input device 71, and the like are temporarily stored in a RAM 13.

A nonvolatile memory 14 is configured as a memory, an SSD, or the like that is backed up by a battery (not illustrated), for instance, and storage status thereof is retained even when the machining condition adjustment device 1 is powered off. The nonvolatile memory 14 stores: a setting area where setting information on operation of the machining condition adjustment device 1 is stored; control programs, data, and the like for the laser beam machining device 2 that are inputted from the input device 71; various types of data acquired from respective units of the machining condition adjustment device 1 or the laser beam machining device 2 (such as laser output, frequency, duty, machining speed, type or pressure of assist gas, material type or plate thickness of a workpiece, nozzle diameter, gap, or focal position in the laser beam machining by the laser beam machining device 2, or amount of generated plasma that is detected by a plasma measuring instrument 4 installed in the laser beam machining device 2, for instance), and control programs, data, and the like for the laser beam machining device 2 that are read in through an external storage device (not illustrated) or a network. The programs, the various types of data, and the like that are stored in the nonvolatile memory 14 may be expanded in the RAM 13 when executed/used. The system programs, including a publicly known analysis program for analysis of various types of data or the like, have been written in advance into the ROM 12.

The plasma measuring instrument 4 is a measuring instrument that measures the amount of the plasma generated in a vicinity of a site where the laser beam machining is carried out, such as a probe measuring instrument, an electromagnetic instrument, a particle measuring instrument, or a spectroscopic measuring instrument. The plasma measuring instrument 4 may be mounted fixedly at any position adjacent to the laser beam machining device 2 or may be mounted on a hand of a robot (not illustrated) installed adjacent to the laser beam machining device 2, for instance, in order to measure the amount of the plasma generated in a vicinity of a machining site for the laser beam machining device 2. It is desirable that the plasma measuring instrument 4 should be capable of measuring the amount of charge carried by the plasma generated in the vicinity of the machining site for the laser beam machining device 2. The CPU 11 is informed of the amount (amount of charge) of the generated plasma in the vicinity of the machining site that is measured by the plasma measuring instrument 4, through an interface 15.

An ionizer 5 is a device that radiates ionized air or rays to a prescribed area, such as a static eliminator of corona discharge type or a static eliminator of ionizing radiation type. The ionizer 5 may be mounted fixedly at any position adjacent to the laser beam machining device 2, may be implemented in a nozzle, or may be mounted on a hand of the robot (not illustrated) installed adjacent to the laser beam machining device 2, for instance, in order to radiate the ionized air or the rays to the vicinity of the machining site for the laser beam machining device 2, in response to an instruction from the CPU 11.

Data obtained as a result of execution of data, a program, or the like read onto the memory, range image data of an object that is obtained from imaging by the plasma measuring instrument 4, data outputted from a machine learning device 100 to be described later, or the like is outputted through an interface 17 so as to be displayed on a display device 70. The input device 71 made of a keyboard, a pointing device, or the like receives an instruction, data, or the like based on operation by the operator and passes the instruction, data, or the like through an interface 18 to the CPU 11.

Figure 2:
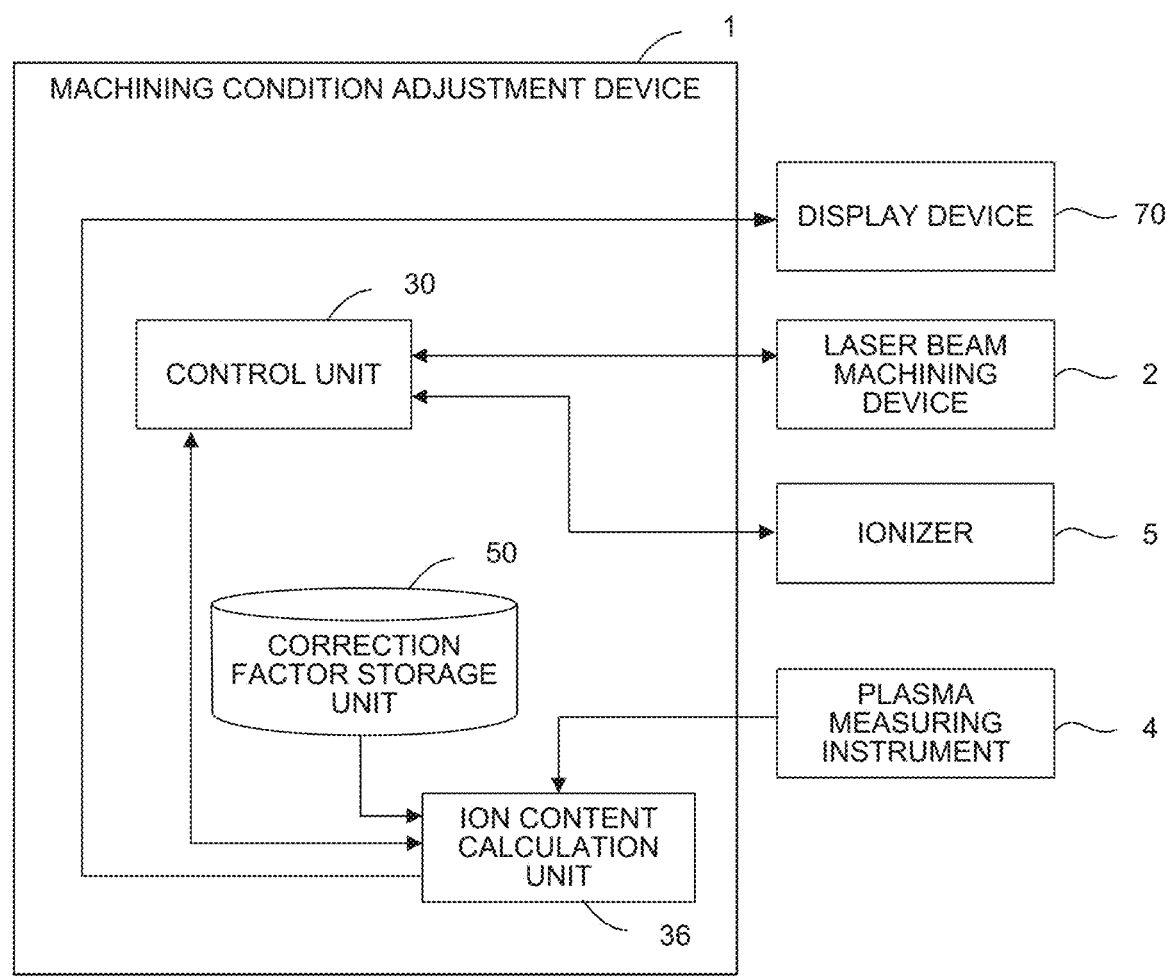
FIG. 2 is a schematic functional block diagram illustrating the machining condition adjustment device according to the first embodiment.

FIG. 2 is a schematic functional block diagram illustrating the machining condition adjustment device 1 according to the first embodiment. Functional blocks illustrated in FIG. 2 are implemented through execution of the system programs and control over operation of the units of the machining condition adjustment device 1 by the CPU 11 included in the machining condition adjustment device 1 illustrated in FIG. 1.

The machining condition adjustment device 1 of the embodiment includes a control unit 30 and an ion content calculation unit 36. In a correction factor storage unit 50 provided on the nonvolatile memory 14, a correction factor has been stored in advance through an external storage device (not illustrated) or a wired/wireless network. The correction factor is used in correction of an amount of charge of the ions that are radiated when the amount of charge carried by the plasma in the vicinity of the machining site for the laser beam machining by the laser beam machining device 2 is neutralized by the ionizer 5.

The control unit 30 controls operation of the laser beam machining device 2 and the ionizer 5 in accordance with an instruction from a control program or the like, in general. The control unit 30 controls the laser beam machining in a state in which the gap is set so that the surface of the workpiece comes to the position, found in advance by an experiment or the like, with the high flow speed of the assist gas ejected from the nozzle or the position that is slightly closer to the nozzle than a portion with the high flow speed of the assist gas. During the control over the laser beam machining device 2, the control unit 30 sequentially acquires instruction values for the laser beam machining device 2 from the control program or the like, or data that can be acquired from the laser beam machining device 2, such as the laser output, the frequency, the duty, the machining speed, or the like, and outputs the instruction values or the data to the ion content calculation unit 36.

The ion content calculation unit 36 calculates the amount of the charge that is to be radiated per unit time from the ionizer 5 based on information acquired from the control unit 30 and the plasma measuring instrument 4, the correction factor preset in the correction factor storage unit 50, and a preset correction equation and instructs the ionizer 5 through the control unit 30 to radiate the calculated amount of charge that neutralizes the amount of charge. Based on the amount of charge that is chiefly acquired from the plasma measuring instrument 4 and that is carried by the plasma in the vicinity of the machining site for the laser beam machining by the laser beam machining device 2, the ion content calculation unit 36 calculates the amount of charge that is required to neutralize the amount of charge and that is to be radiated per unit time. The ion content calculation unit 36 reads out the correction factor, corresponding to material and the plate thickness of the workpiece that is being currently machined, from the correction factor storage unit 50, as appropriate, calculates a correction amount with use of the correction equation based on the correction factor or the laser output, the frequency, the duty, the machining speed, or the like for the laser beam machining, and calculates a value obtained from addition of the calculated correction amount to the amount of charge to be radiated per unit time that is needed to neutralize the amount of charge carried by the plasma.

Figures 3, 4:
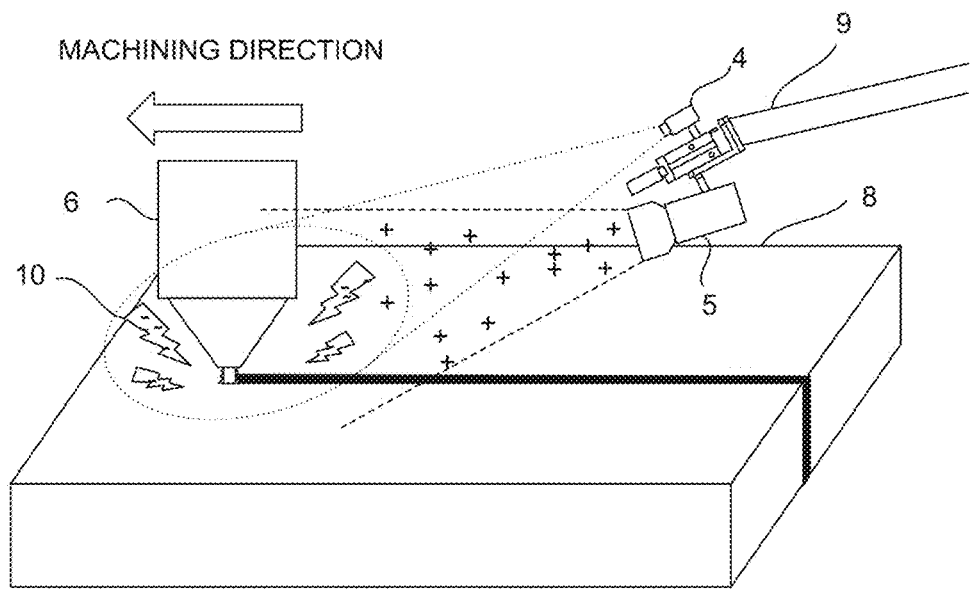
FIG. 3 is a diagram illustrating an example of definition of correction factors according to the first embodiment.
FIG. 4 is a diagram for description of a method of neutralizing an amount of charge carried by plasma during laser beam machining by the machining condition adjustment device of FIG. 2.

FIG. 3 illustrates an example of correction factors that are stored in the correction factor storage unit 50 and that correspond to the material and the plate thickness of the workpiece.

The correction amount calculated by the ion content calculation unit 36 allows for an amount of charge that is to be radiated per unit time in order to neutralize an amount of charge to be further increased by the laser beam machining by the laser beam machining device 2 between measurement by the plasma measuring instrument 4 of the amount of charge carried by the plasma and radiation by the ionizer 5 of the amount of charge for neutralization. The correction equation and the correction factors, corresponding to the material and the plate thickness of the workpiece for calculation of the correction amount should be determined in advance by an experiment with use of a plurality of workpieces and a plurality of machining conditions or the like.

FIG. 4 is a diagram illustrating an example of the laser beam machining by the laser beam machining device 2.

In the laser beam machining by the laser beam machining device 2 in the machining condition adjustment device 1 having above configurations, as illustrated in FIG. 4 as the example, an amount of plasma 10 generated in the vicinity of the machining site is measured by the plasma measuring instrument 4 and the ionized air or the rays is radiated from the ionizer 5 to the vicinity of the machining site so as to cancel out an amount of charge carried by the plasma 10. As a result, a charge carried by the plasma 10 generated in the vicinity of the machining site is neutralized so that improvement in cutting quality on a machined surface in the laser beam machining may be anticipated.

Figure 5:
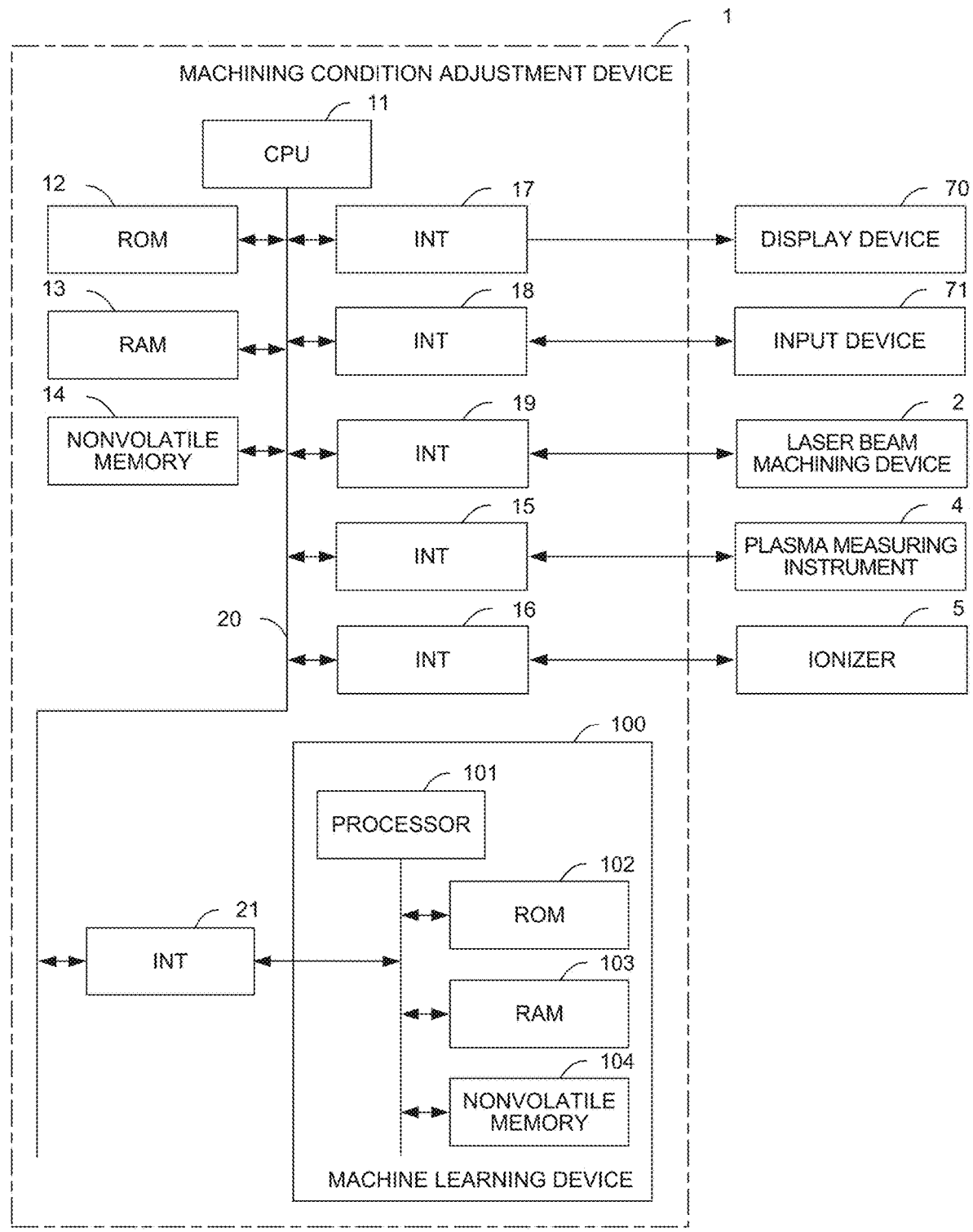
FIG. 5 is a schematic hardware configuration diagram illustrating a machining condition adjustment device according to a second embodiment.

FIG. 5 is a schematic hardware configuration diagram illustrating major parts of a machining condition adjustment device including a machine learning device according to a second embodiment.

The machining condition adjustment device 1 according to the present embodiment includes the machine learning device 100 in addition to the configurations included by the machining condition adjustment device 1 according to the first embodiment described with use of FIG. 1. Through machine learning by the machine learning device 100, the amount of charge that is required to neutralize the amount of charge carried by the plasma generated in the vicinity of the machining site for the laser beam machining by the laser beam machining device 2 is estimated.

An interface 21 is an interface for connection between the machining condition adjustment device 1 and the machine learning device 100. The machine learning device 100 includes a processor 101 which controls the whole machine learning device 100, a ROM 102 in which system programs and the like are stored, a RAM 103 for temporary storage in processes related to the machine learning, and a nonvolatile memory 104 that is used for storage of a learning model or the like. The machine learning device 100 is capable of observing various types of information that may be acquired from the machining condition adjustment device 1 through the interface 21 (such as the laser output, the frequency, the duty, the machining speed, the type or pressure of the assist gas, the material type or plate thickness of a workpiece, the nozzle diameter, the gap, or the focal position in the laser beam machining by the laser beam machining device 2 or the amount of the generated plasma that is detected by the plasma measuring instrument 4 installed in the laser beam machining device 2).

The machining condition adjustment device 1 acquires a processing result, outputted from the machine learning device 100, through the interface 21 and controls the operation of the ionizer 5 based on the acquired result.

Figure 6:
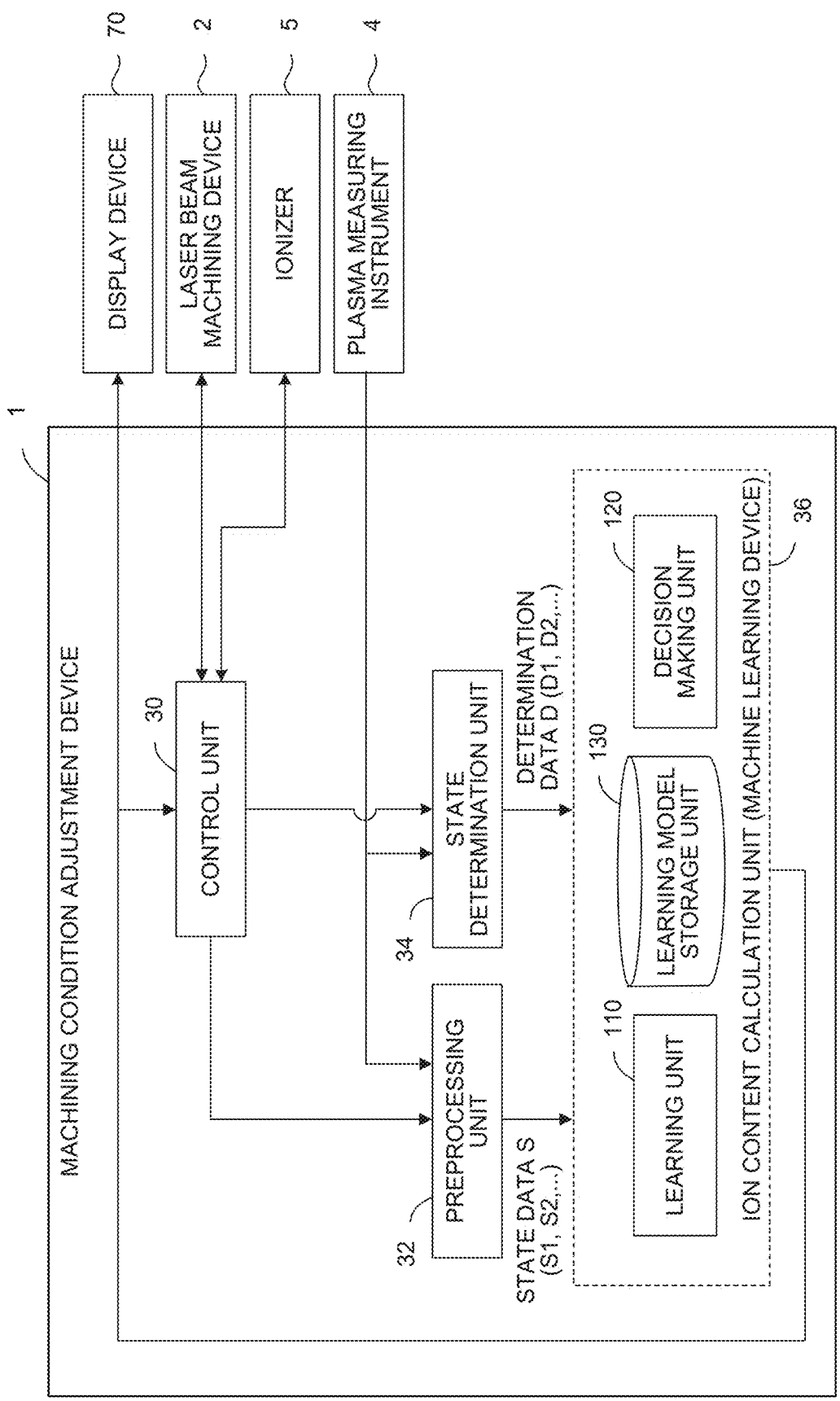
FIG. 6 is a schematic functional block diagram illustrating the machining condition adjustment device according to the second embodiment.
Figure 7:
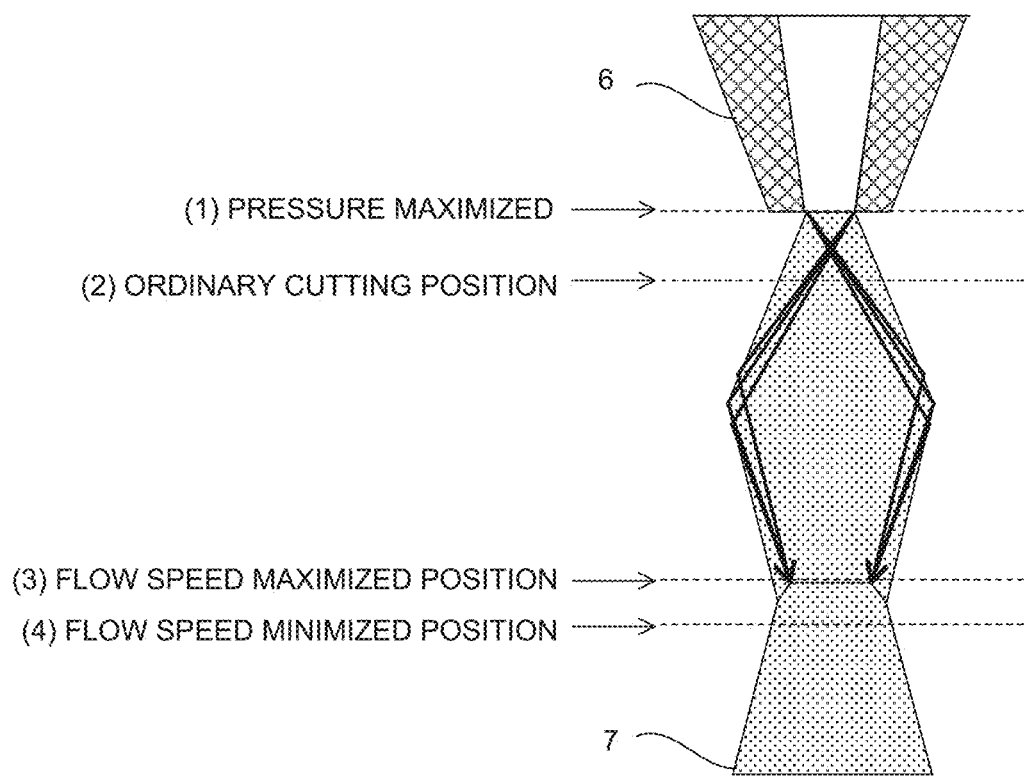
FIG. 7 is a diagram illustrating flow of assist gas ejected from an end of a nozzle in laser beam machining by a laser beam machining device.

FIG. 6 is a schematic functional block diagram illustrating the machining condition adjustment device 1 and the machine learning device 100 according to the second embodiment. Functional blocks illustrated in FIG. 6 are implemented through execution of the respective system programs and control over operation of respective units of the machining condition adjustment device 1 and the machine learning device 100 by the CPU 11 included by the machining condition adjustment device 1 illustrated in FIG. 5 and the processor 101 of the machine learning device 100.

The machining condition adjustment device 1 of the embodiment includes the control unit 30, a preprocessing unit 32, a state determination unit 34, and the ion content calculation unit 36. The ion content calculation unit 36 is configured on the machine learning device 100 and includes a learning unit 110, a decision making unit 120, and a learning model storage unit 130.

As with the first embodiment, the control unit 30 controls the operation of the laser beam machining device 2 and the ionizer 5 in accordance with an instruction from a control program or the like, in general. The control unit 30 controls the laser beam machining in the state in which the gap is set so that the surface of the workpiece comes to the position, determined in advance by an experiment or the like, with the high flow speed of the assist gas ejected from the nozzle or a position that is slightly closer to the nozzle than the a portion with the high flow speed of the assist gas. During the control over the laser beam machining device 2, the control unit 30 sequentially acquires instruction values for the laser beam machining device 2 from the control program or the like, or data that may be acquired from the laser beam machining device 2, such as the laser output, the frequency, the duty, the machining speed, or the like, and outputs the instruction values or the data to the ion content calculation unit 36.

The preprocessing unit 32 produces state data S for use in learning and decision making by the machine learning device 100 configured as the ion content calculation unit 36, based on information acquired from the control unit 30, the plasma measuring instrument 4, and the ionizer 5. The preprocessing unit 32 produces the state data S by conversion (such as digitization, normalization, or sampling) of acquired data into a unified format that is handled in the machine learning device 100. The state data S produced by the preprocessing unit 32 includes ionizer setting data S1 related to settings of the ionizer 5, workpiece data S2 related to the workpiece to be an object of the laser beam machining, plasma generation state data S3 related to a generation state of the plasma, and machining condition data S4 indicating a machining condition during the laser beam machining.

The ionizer setting data S1 includes the amount of charge that is radiated per unit time from the ionizer 5. The ionizer setting data S1 may secondarily include information on an airflow from the ionizer 5, a site where the ions are radiated or generated, or the like.

The workpiece data S2 includes a type of the material (such as iron or aluminum) and the plate thickness of the workpiece as an object of the laser beam machining by the laser beam machining device 2. For the type of the material and the plate thickness of the workpiece, information inputted by an operator through an operation panel of the laser beam machining device 2 or the like to the laser beam machining device 2 before a start of the laser beam machining, information inputted by the operator through the input device 71 to the machining condition adjustment device 1, and information acquired from another computer (not illustrated) of a production planning device or the like through a network, for instance, can be used.

The plasma generation state data S3 includes the amount of charge that is measured by the plasma measuring instrument 4 and that is carried by the plasma in the vicinity of the position where the laser beam machining is being carried out by the laser beam machining device 2.

The machining condition data S4 may be acquired as laser beam machining conditions in the laser beam machining that is carried out by the laser beam machining device 2. The laser beam machining conditions in the laser beam machining may include the laser output, the frequency, the duty, the machining speed, the type or pressure of the assist gas, the nozzle diameter, the focal position, the gap that is a distance from the end of the nozzle to the workpiece, or the like in the laser beam machining, for instance. The laser beam machining conditions are set in the control program that controls the operation of the laser beam machining device 2 or the machining condition adjustment device 1 and can be acquired from, for example, laser beam machining parameters stored in the nonvolatile memory 14.

The state determination unit 34 makes a determination of the generation state of the current plasma, based on the amount of charge that is carried by the plasma in the vicinity of the position where the laser beam machining is being carried out by the laser beam machining device 2, which is measured by the plasma measuring instrument 4, and produces determination data D as a result of the determination. The determination data D produced by the state determination unit 34 includes plasma generation amount determination data D1 indicating a degree of deviation from a state in which the amount of charge carried by the plasma is completely neutralized (amount of charge of zero).

The state determination unit 34 is an essential configuration during a stage of the learning but is not necessarily an essential configuration after the learning by the learning unit 110 of adjustment action for the settings of the ionizer 5 in the laser beam machining is completed. In case where the machine learning device 100 that has completed the learning is shipped to a customer, for instance, the machine learning device 100 from which the state determination unit 34 has been removed may be shipped.

The learning unit 110 conducts reinforcement learning with use of the state data S produced by the preprocessing unit 32 and the determination data D produced by the state determination unit 34 and generates (learns) a learned model that has learned appropriateness of the adjustment action for the settings of the ionizer 5 with respect to the generation state of the plasma in the laser beam machining under prescribed machining conditions. The reinforcement learning is a technique in which a cycle including observing a current state (that is, input) of an environment where a learning object exists, executing prescribed action (that is, output) in the current state, and conferring some reward for the executed action is iterated by a trial-and-error method and in which a measure (the adjustment action for the settings of the ionizer 5 in the laser beam machining, in the machine learning device 36 of FIG. 6) that maximizes total of such rewards is learned as an optimal solution.

The learning unit 110 determines a reward R associated with a result (corresponding to the determination data D produced in a learning period subsequent to acquisition of state variables S) of the determination of appropriateness of the amount of charge carried by the plasma generated in a vicinity of a machined portion for the laser beam machining by the laser beam machining device 2 under the prescribed laser beam machining conditions, with use of algorithm known as Q-learning, for instance, and updates a function Q (learning model) representing a value of the adjustment action for the settings of the ionizer 5, with use of the determined reward R.

Thus the function $Q(s, a)$ is used as the learning model, the function $Q(s, a)$ representing a value of the action in the case where action a (adjustment action for the settings of the ionizer 5, such as adjustment action for the amount of charge that is to be radiated per unit time) is selected in a prescribed state s (defined by the state variables S), and the selection of the action a that maximizes the value function Q in the state s makes an optimal solution. During the learning, the learning unit 110 starts the Q-learning in a state in which correlation between the state s and the action a is unknown, iterates trials and errors in which various types of the action a are selected in the arbitrary state s, and iteratively updates the value function Q so that the value function Q can approximate to the optimal solution. By iterating update of the function Q representing the value, the learning unit 110 learns the adjustment of the settings of the ionizer 5 (such as adjustment in the amount of charge that is radiated per unit time) with respect to the amount of charge carried by the plasma generated in the laser beam machining of the workpiece under the prescribed machining conditions.

In the Q-learning by the learning unit 110, for instance, the reward R may be positive (plus) when the result of the determination of appropriateness of the amount of charge carried by the plasma generated in the laser beam machining under the prescribed laser beam machining conditions is "satisfactory" (that is, when the amount of charge carried by the plasma is nearly neutralized, for instance) and may be negative (minus) when the result of the determination of appropriateness is "unsatisfactory" (when the amount of charge carried by the plasma is deviated from a neutralized state by a prescribed threshold or more, for instance). A value of the reward R may be changed in accordance with the degree of the deviation in the amount of charge carried by the plasma from the neutralized state. In case where a plurality of pieces of data are included in the determination data D, the plurality of pieces of data may be combined as conditions for the determination.

The learning unit 110 may use a neural network as the value function Q (learning model) and may be configured to use the state variable S and the action a as input of the neural network and to output a value (result y) of the action a in a state. In such a configuration, the neural network having three layers made of an input layer, an interlayer, and an output layer may be used as the learning model or a so-called deep learning technique with use of the neural network that forms three or more layers may be used so that more effective learning and inferencing may be carried out. The learned model generated by the learning unit 110 is stored in the learning model storage unit 130 provided on the nonvolatile memory 104 and is used for an estimation process for the adjustment action for the settings of the ionizer 5 by the decision making unit 120.

The learning unit 110 is an essential configuration during the stage of the learning but is not necessarily an essential configuration after the learning of the settings of the ionizer 5 by the learning unit 110 is completed. In case where the machine learning device 100 that has completed the learning is shipped to a customer, for instance, the machine learning device 100 from which the learning unit 110 has been removed may be shipped.

The decision making unit 120 determines the optimal solution of the adjustment action for the settings of the ionizer 5 with use of the learned model stored in the learning model storage unit 130 based on the state data S inputted from the preprocessing unit 32 and outputs the determined adjustment action for the settings of the ionizer 5. In the decision making unit 120 of the embodiment, the state data S inputted from the preprocessing unit 32 (the ionizer setting data S1, the workpiece data S2, the plasma generation state data S3, and the machining condition data S4) and the adjustment action for the settings of the ionizer 5 (such as the amount of charge that is radiated per unit time) are inputted as input data to the learned model generated (having parameters determined) through the reinforcement learning by the learning unit 110, so that the reward to be given when the action is executed in the current state may be calculated. Calculation of the reward is made for a plurality of manners of the adjustment action for the settings of the ionizer 5 that may be currently executed and a comparison among a plurality of calculated rewards is made. As a result, the adjustment action for the settings of the ionizer 5 that results in the calculation of the largest reward is estimated as an optimal solution. The optimal solution, estimated by the decision making unit 120, of the adjustment action for the settings of the ionizer 5 is inputted to the control unit 30 in order to be used for the adjustment of the settings of the ionizer 5 and may be further used so as to be displayed as output on the display device 70 or so as to be transmitted as output through a wired/wireless network to a host computer or a cloud computer (not illustrated) or the like, for instance.

Provision of above configurations enables accurate control over the ionizer 5 by which the charge that is carried by the plasma generated during the laser beam machining and that is changed by various factors related to the machining may be neutralized and enables the improvement in the cutting appropriateness for the workpiece in the laser beam machining.

Though the embodiments of the present invention have been described above, the present invention is not limited to the examples of the embodiments described above and may be embodied in various manners with appropriate modifications.

For instance, learning algorithm that is executed by the machine learning device 100, arithmetic algorithm that is executed by the machine learning device 100, control algorithm that is executed by the machining condition adjustment device 1, and the like are not limited to the above and various variations of algorithm may be employed.

Though the machining condition adjustment device 1 and the machine learning device 100 are described as devices having different CPUs (processors), for the above embodiments, the machine learning device 100 may be implemented by the CPU 11 included in the machining condition adjustment device 1 and the system programs stored in the ROM 12.

The invention claimed is:

1. A laser beam machining system, comprising:
   a laser beam machining device configured to generate a laser to perform laser beam machining of a workpiece;
   an ionizer configured to neutralize a charge carried by plasma generated during the laser beam machining of the workpiece by the laser beam machining device;
   a plasma measuring device configured to measure an amount of charge carried by the plasma generated during the laser beam machining; and
   a processor configured to
      calculate an amount of charge per unit time that is to be radiated from the ionizer, based on at least the amount of charge carried by the plasma generated during the laser beam machining and measured by the plasma measuring device, and
      set the ionizer to radiate the calculated amount of charge per unit time that neutralizes the amount of charge carried by the plasma.

2. A machining condition adjustment device for adjusting settings of an ionizer so as to neutralize a charge carried by plasma generated during laser beam machining of a workpiece by a laser beam machining device, the machining condition adjustment device comprising:
   a processor configured to
      calculate an amount of charge per unit time that is to be radiated from the ionizer, based on at least an amount of charge carried by the plasma generated during the laser beam machining and measured by a plasma measuring device, and
      set the ionizer to radiate the calculated amount of charge per unit time; anda correction factor storage device in which a correction factor set in association with at least material and a plate thickness of the workpiece is stored, wherein
   the processor is further configured to calculate a correction value for correction for the amount of charge per unit time that is calculated based on the amount of charge carried by the plasma generated during the laser beam machining and that is to be radiated from the ionizer, with use of a preset correction equation, based on the correction factor read out from the correction factor storage device based on the material and the plate thickness of the workpiece to be subjected to the laser beam machining and a laser beam machining condition set for the laser beam machining.

3. A machining condition adjustment device for adjusting settings of an ionizer so as to neutralize a charge carried by plasma generated during laser beam machining of a workpiece by a laser beam machining device, the machining condition adjustment device comprising:
   a processor configured to
      calculate an amount of charge per unit time that is to be radiated from the ionizer, based on at least an amount of charge carried by the plasma generated during the laser beam machining and measured by a plasma measuring device,
      set the ionizer to radiate the calculated amount of charge per unit time,
      produce state variables including
         ionizer setting data related to the settings of the ionizer,
         workpiece data related to the workpiece,
         plasma generation state data related to the amount of charge carried by the plasma generated during the laser beam machining, and
         machining condition data indicating a machining condition during the laser beam machining,
      produce determination data including plasma generation amount determination data for determination of appropriateness of the amount of charge carried by the plasma in the laser beam machining by the laser beam machining device, and
      learn adjustment action for the settings of the ionizer with respect to the amount of charge carried by the plasma generated in the laser beam machining of the workpiece under a prescribed laser beam machining condition, with use of the state variables and the determination data, wherein
   the plasma generation amount determination data is intended for determination of appropriateness of the amount of charge carried by the plasma generated in the laser beam machining of the workpiece under the laser beam machining condition adjusted by adjustment action for the settings of the ionizer.

4. The machining condition adjustment device according to claim 3, wherein
   the processor is further configured to conduct reinforcement learning in which a high reward is conferred when the amount of charge carried by the plasma generated in the laser beam machining of the workpiece under the prescribed laser beam machining condition is near to a neutralized state.

5. The machining condition adjustment device according to claim 3, wherein
the adjustment action for the settings of the ionizer is adjustment action for an amount of charge per unit time that is to be radiated to a vicinity of a machined portion during the laser beam machining.

6. A machining condition adjustment device for adjusting settings of an ionizer so as to neutralize a charge carried by plasma generated during laser beam machining of a workpiece by a laser beam machining device, the machining condition adjustment device comprising:
a processor configured to
calculate an amount of charge per unit time that is to be radiated from the ionizer, based on at least an amount of charge carried by the plasma generated during the laser beam machining and measured by a plasma measuring device,
set the ionizer to radiate the calculated amount of charge per unit time, and
produce state variables including
ionizer setting data related to the settings of the ionizer,
workpiece data related to the workpiece,
plasma generation state data related to the amount of charge carried by the plasma generated during the laser beam machining, and
machining condition data indicating a machining condition during the
laser beam machining,
wherein
the machining condition adjustment device further comprises a learning model storage device configured to store a learned model that has learned adjustment action for the settings of the ionizer with respect to the amount of charge carried by the plasma generated in the laser beam machining of the workpiece under a prescribed laser beam machining condition, and
the processor is configured to estimate the adjustment action for the settings of the ionizer with use of the learned model based on the state variables.

* * * * *